(12) United States Patent
Hosch et al.

(10) Patent No.: US 7,549,531 B2
(45) Date of Patent: Jun. 23, 2009

(54) SANITARY CONVEYOR TIP-UP TAIL ASSEMBLY

(75) Inventors: Michael A. Hosch, Oconomowoc, WI (US); Scott M. Hall, Sussex, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 11/326,176

(22) Filed: Jan. 5, 2006

(65) Prior Publication Data

US 2006/0151294 A1 Jul. 13, 2006

Related U.S. Application Data

(60) Provisional application No. 60/642,415, filed on Jan. 7, 2005.

(51) Int. Cl.
*B65G 23/44* (2006.01)
*B65G 23/00* (2006.01)

(52) U.S. Cl. .................. 198/493; 198/494; 198/813; 198/814; 198/835

(58) Field of Classification Search ............... 198/493, 198/814, 84, 841, 494, 813, 835
See application file for complete search history.

(56) References Cited

U.S. PATENT DOCUMENTS

| | | | | |
|---|---|---|---|---|
| 3,442,370 A | * | 5/1969 | Goodale ............... 198/860.2 |
| 3,456,776 A | * | 7/1969 | Viene ................... 198/813 |
| 4,041,785 A | * | 8/1977 | Roark ................... 74/11 |
| 4,089,404 A | * | 5/1978 | Venzke ................. 198/370.04 |
| 4,198,886 A | * | 4/1980 | Bowers et al. .......... 83/112 |
| 4,372,440 A | * | 2/1983 | Ringis .................. 198/728 |
| 4,542,616 A | * | 9/1985 | Ulrich et al. ........... 53/136.4 |
| 5,174,435 A | | 12/1992 | Dorner et al. |
| 5,620,601 A | * | 4/1997 | Wilcher et al. ......... 210/525 |
| 6,109,427 A | | 8/2000 | Hosch et al. |
| 6,298,981 B1 | | 10/2001 | Hosch et al. |
| 6,685,009 B1 | | 2/2004 | Hosch et al. |
| 6,871,737 B2 | | 3/2005 | Ertel et al. |
| 6,968,942 B2 | * | 11/2005 | Linder ................. 198/841 |
| 6,969,942 B2 | * | 11/2005 | Takeshima et al. ...... 310/324 |

* cited by examiner

*Primary Examiner*—Gene Crawford
*Assistant Examiner*—Kavel P Singh
(74) *Attorney, Agent, or Firm*—Andrus, Sceales, Starke & Sawall, LLP

(57) ABSTRACT

A tip-up tail assembly is provided at the end of a continuous conveyor assembly having a moving conveyor belt. The tip-up tail assembly when moved to a retracted position allows the conveyor assembly to be completely sanitized without removal of the conveyor belt and without need for tools to assemble and disassemble the tail assembly. When sanitation is complete, the tip-up tail assembly is then moved to a horizontal operating position and supported by a pair of locking mechanisms. The locking mechanisms prevent the tip-up tail assembly from going below the horizontal operating position of the conveyor assembly.

15 Claims, 10 Drawing Sheets

SANITARY CONVEYOR TIP-UP TAIL ASSEMBLY

CROSS-REFERENCE TO RELATED APPLICATIONS

This application relates to and claims priority based on U.S. Provisional Patent Application Ser. No. 60/642,415 filed Jan. 7, 2005.

BACKGROUND OF THE INVENTION

The present invention relates to a tip-up tail assembly for a conveyor assembly that is particularly useful in a sanitary environment. More specifically, the present invention relates to a tail assembly in which the end roller of the conveyor assembly can be rotated upward such that the conveyor belt may be lifted from the conveyor frame assembly such that the conveyor frame assembly can be easily washed and sanitized.

Presently, in food processing conveyor applications, conveyors must be manufactured such that the conveyor belt can be removed and the entire conveyor frame assembly sanitized. Following sanitization, the conveyor belt must be reinstalled for continued operation. The present invention allows the end roller to move upward to shorten the length of the conveyor assembly such that the belt can be lifted from the conveyor frame assembly for sanitization without removal of the belt.

Currently, numerous guidelines exist regarding the type of conveyor assembly that can be used in a sanitary environment, such as in a food processing facility. Typically, these guidelines require that the conveyor frame assembly must be washable and thus sanitized. As such, conveyor frame assemblies constructed for use in a sanitary food processing facility must be easily disassembled to allow complete cleaning. Preferably, the disassembly should require no tools, if possible.

In many prior art sanitary conveyor frame systems, the structural elements that form the conveyor frame are typically welded to each other to provide a sealed unit. The conveyor frame consists of a pair of stainless siderails that have multiple cross support members welded between the siderails. The cross support members are structurally welded to the inside surface of the siderail. The end roller of the tip-up tail assembly is used to allow a continuous belt to run around the conveyor frame assembly. The present invention relates to a tip-up tail assembly that allows the conveyor belt to be lifted from the conveyor frame assembly, thus allowing for sanitization of the conveyor frame without removal of the conveyor belt. The tip-up tail assembly requires no tools to assemble or disassemble the assembly.

The present invention provides for a tip-up tail assembly that can be used in a sanitary environment which allows the conveyor belt to remain on the conveyor frame assembly. Further, the present invention provides a tip-up tail assembly that allows for sanitation of the conveyor frame assembly and reduces the time needed to remove and replace the conveyor belt before and after sanitation of the conveyor frame.

SUMMARY OF THE INVENTION

The present invention relates to a conveyor assembly having a continuous conveyor belt including an upper run and a lower run supported on support members between a pair of spaced side frame members. Each side frame member extends between a first end and a second end. A tail assembly extends outwardly at one of the first and second ends of the side frame members and is engageable with the conveyor belt for tensioning the conveyor belt and maintaining the upper and lower runs in substantially parallel relationship. The invention is improved by a tip-up tail assembly which is pivotally attached to one of the first and second ends of the side frame members and is rotatable relative to and above the conveyor assembly to temporarily separate the conveyor belt from the conveyor assembly without removal of the conveyor belt.

The tip-up tail assembly includes a pair of spaced side arms having first ends rotatably attached to the side frame members and second ends rotatably receiving opposite ends of a roller assembly engagable with the conveyor belt to change tension thereon. The side arms and the roller assembly are rotatable between an extended, operating position and a retracted, cleaning position. In the operating position, the roller assembly maintains the upper and lower runs of the conveyor belt in substantially parallel relationship. In the retracted, cleaning position, the conveyor belt is temporarily separated from the support members of the conveyor assembly to enable sanitation of the conveyor assembly without removal of the conveyor belt.

A support brace is interconnected between the side arms adjacent the roller assembly. The side arms are preferably constructed of elongated, cylindrical members. The second ends of these side arms include a roller housing having a bearing assembly for receiving a roller shaft. The roller shaft carries a series of conveyor belt-engaging rollers preferably formed of UHMW plastic. Certain of the rollers are formed with flanges for restricting lateral movement of the conveyor belt. In the extended, operating position, longitudinal axes of the side arms lie substantially parallel to longitudinal axes of the side frame members. Planes of the upper and lower runs of the conveyor belt are substantially parallel to each other. In the retracted position, the longitudinal axes of the side arms lie at substantially acute angles relative to the longitudinal axes of the side frame members.

In a preferred embodiment of the invention, an axle extends between the side frame members and has outer ends protruding beyond the side frame members and formed with bores passing transversely therethrough. The axle is rotatably mounted in the side frame members at one of the first and second ends of the side frame members. A pair of spaced side arms has first ends received and adjustably retained in the bores of the axle, and second ends rotatably receiving opposite ends of a roller assembly engagable with the conveyor belt. The side arms and the roller assembly are rotatable on the axle between the operating position and the retracted position.

The conveyor assembly further includes cross supports connected between the side frame members for holding the support members. Locking mechanisms are attached to the axle and engagable with one of the cross supports for defining the extent of rotational travel of the operating and retracted positions. The locking mechanisms are positioned immediately adjacent inside surfaces of the side frame members. The position of the locking mechanisms within the side frame members of the conveyor assembly eliminates pinch points during movement from the operating and retracted positions. Each locking mechanism is preferably a clip removably attached to the axle. Each clip is frictionally retained on the axle and received in a groove formed on the axle. Each locking mechanism has a first stop position engagable with a top portion of the one cross support when the tail assembly is in the operating position. Each locking mechanism has a second stop portion engagable with a rear surface of the one cross support when the tail assembly is in the retracted position.

The first ends of the side arms have a series of adjustment grooves which are selectively engagable with pins passing transversely through the outer ends of the axle to change the length of the side arms and alter the tension on the conveyor belt.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
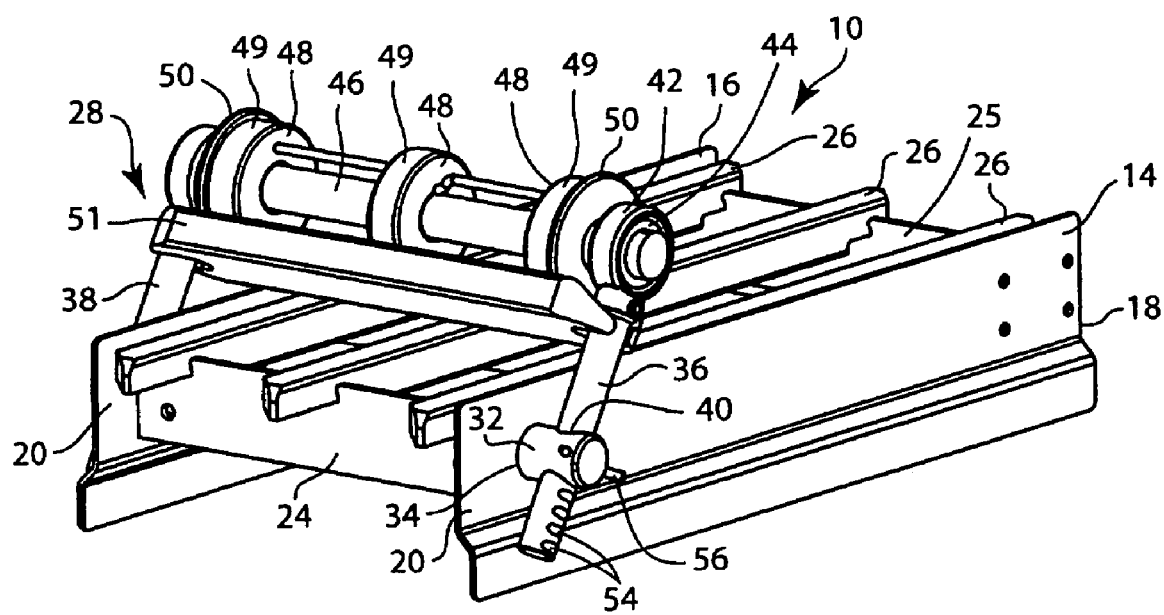
FIG. 1 is a perspective view illustrating the tip-up tail assembly of the present invention in its retracted position.

FIG. 1 illustrates a conveyor assembly 10 that includes a continuous conveyor belt 12 used to transport articles. The conveyor assembly 10 includes a pair of side frame members 14, 16 spaced from each other by the width of the conveyor belt 12. Each side frame member extends from a first end 18 to a second end 20. The side frame members 14, 16 are joined by a series of cross members 22 and cross supports 24, 25. The cross supports 24, 25 receive and support a series of spaced slide rails 26 that provide support for an upper run 29 of the conveyor belt 12.

Figure 5:
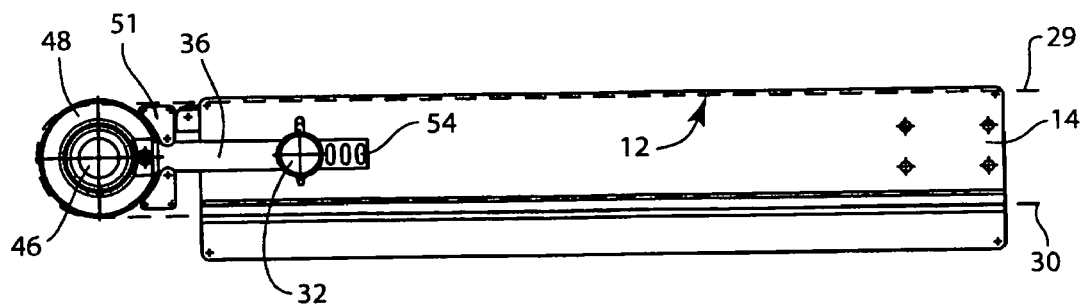
FIG. 5 is a side view of the tip-up tail assembly of FIG. 4.

As best illustrated in FIG. 5, the continuous conveyor belt normally defines the upper run 29 and a lower run 30 which extend along generally parallel horizontal planes. In the embodiment of the invention as illustrated, the continuous conveyor belt 12 may be formed from plastic links, such as sold by Intralox, LLC. The continuous conveyor belt 12 is particularly useful in a sanitary conveyor since the plastic links of the conveyor belt 12 can be easily sanitized and inhibit the growth of bacteria. However, the invention can be utilized with other types of conveyor belts other than belts formed from interlocking plastic links.

The transition from the upper run 29 to the lower run 30 occurs over a tip-up tail assembly 28 which is rotatably attached to the conveyor assembly 10 by means of an axle 32. The axle 32 extends across the entire width of the conveyor assembly 10, and has ends protruding outwardly through bores 34 formed in both of the side frame members 14, 16 at the second ends 20 thereof. As illustrated in FIG. 1, the tip-up tail assembly 28 includes a pair of generally elongated, cylindrical, spaced side arms 36, 38 that extend along opposite sides of the conveyor assembly 10 outside side frame members 14, 16. The side arms 36, 38 are spaced by a distance that generally corresponds to the width of the conveyor assembly 10 to be used with the tip-up tail assembly 28. The axle 32 is freely rotatable relative to the side frame members 14, 16 to allow the entire tail assembly 28 to move between a retracted, conveyor belt-lifting position shown in FIGS. 1 and 2, and an extended, operating position shown in FIGS. 4 and 5. In the operating position, the upper run 29 of conveyor belt 12 is in substantially constant contact with slide rails 26 of the conveyor assembly 10. Each end of axle 32 includes a central bore 40 that includes one of the side arms 36, 38 of the tail assembly 28. Each of the side arms 36, 38 is movable through the bore 40 along the length of a respective side arm 36, 38.

Each of the side arms 36, 38 includes a roller housing 42 that receives and retains a bearing assembly 44 that allows a roller shaft 46 to rotate relative to the side arms 36, 38. The roller shaft 46 supports a plurality of spaced apart rollers 48 having smooth contact faces 49 which are engagable with the conveyor belt 12. The outermost rollers 48 each include an outer flange 50 extending past smooth contact face 49 to limit the lateral movement of conveyor belt 12, and maintain alignment of the belt 12 with the conveyor assembly 10. The rollers 48 are typically fabricated from UHMW plastic to provide the required durability and low friction required to support and contact as well as preserve the moving conveyor belt 12. The plastic UHMW material is particularly desirable when the conveyor assembly 10 is used in a food processing application where easy sanitation is necessary.

As shown in FIG. 1, a support brace 51 extends between the pair of spaced side arms 36, 38 to provide additional support for the roller assembly. Bifurcated ends 52 (FIG. 7) of the support brace 51 are fixedly engaged around a portion of the periphery of the side arms 36, 38 to prevent shifting thereof. It should be understood that the width of the conveyor assembly 10 can vary, and only spacing in number of rollers 48 and the length of the shaft 46 and the support brace 50 would change in accordance with those widths of conveyor assembly 10.

Figure 2:
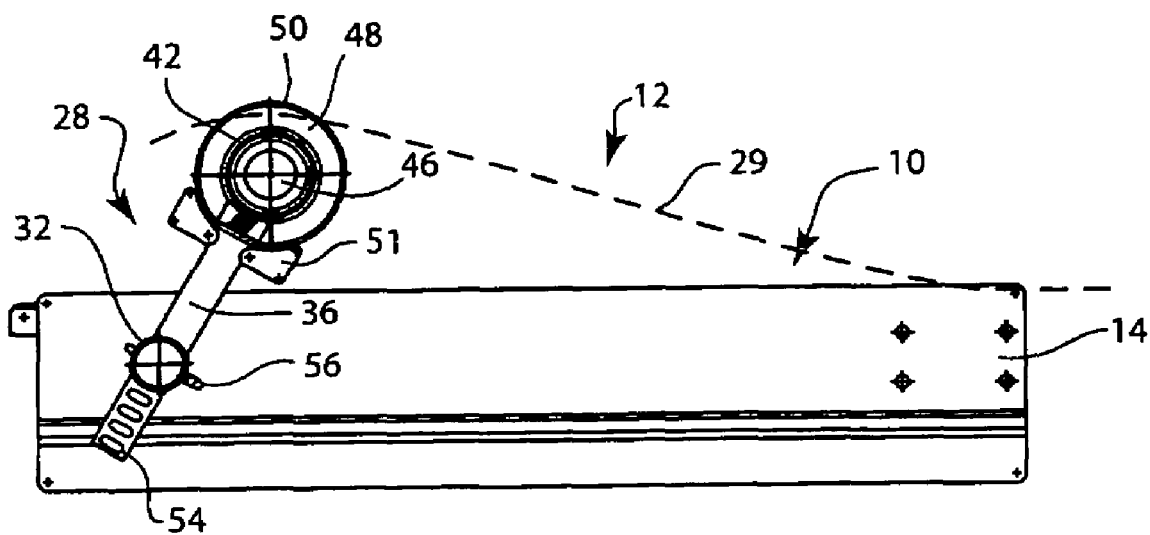
FIG. 2 is a side view of the tip-up tail assembly of FIG. 1.
Figure 2A:
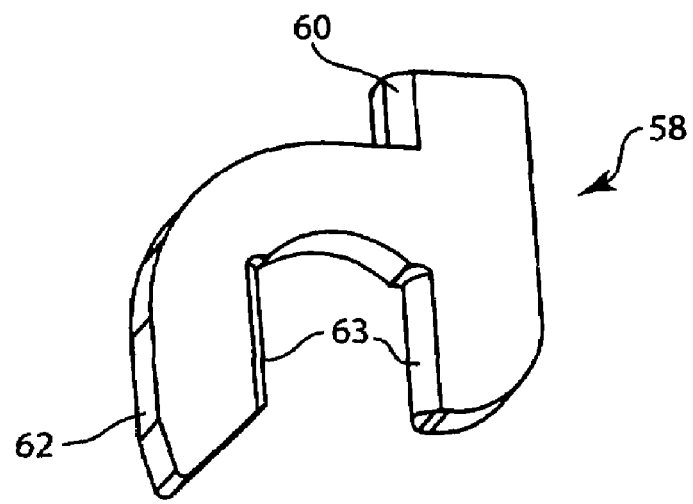
FIG. 2A is a perspective view of a locking mechanism used in the tip-up tail assembly.
Figure 6B:
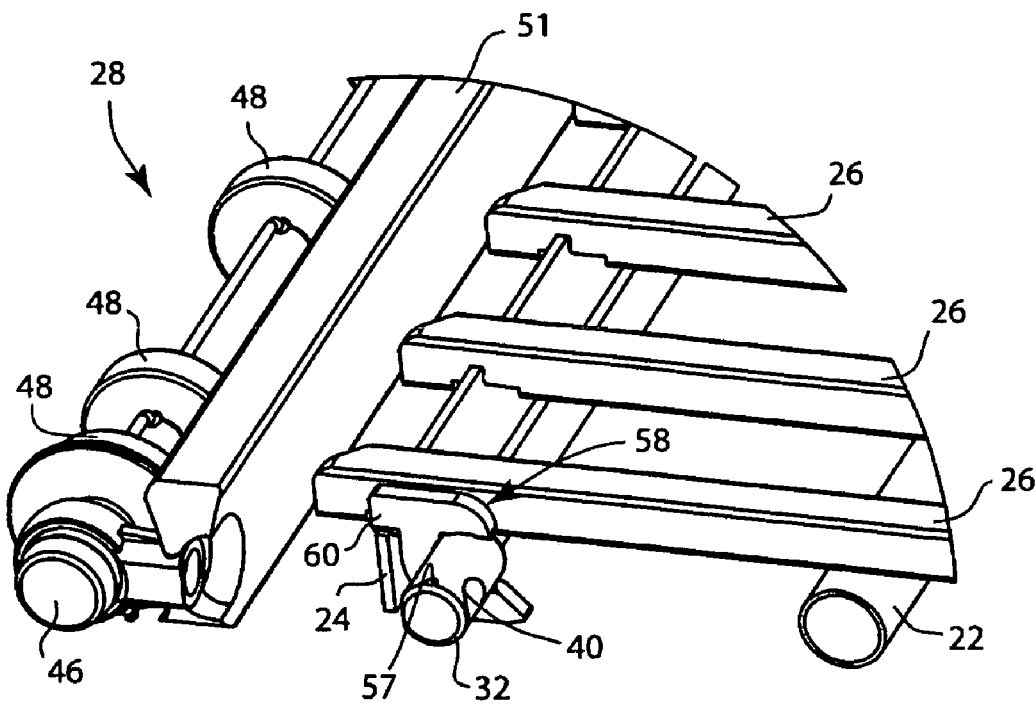
FIG. 6B is a partial exploded, top perspective view broken away to show the locking mechanism in the operating position.
Figure 6C:
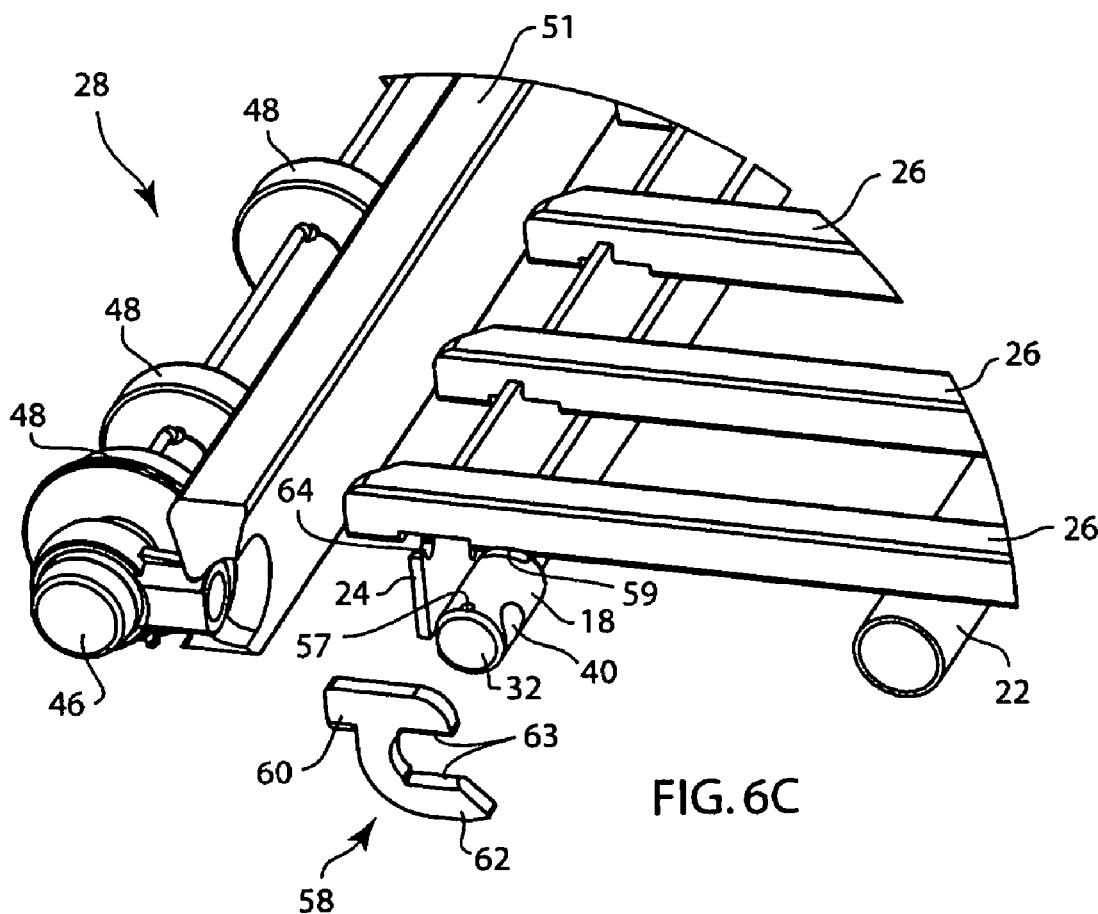
FIG. 6C is a view like FIG. 6B but showing the locking mechanism in an exploded view.
Figure 7:
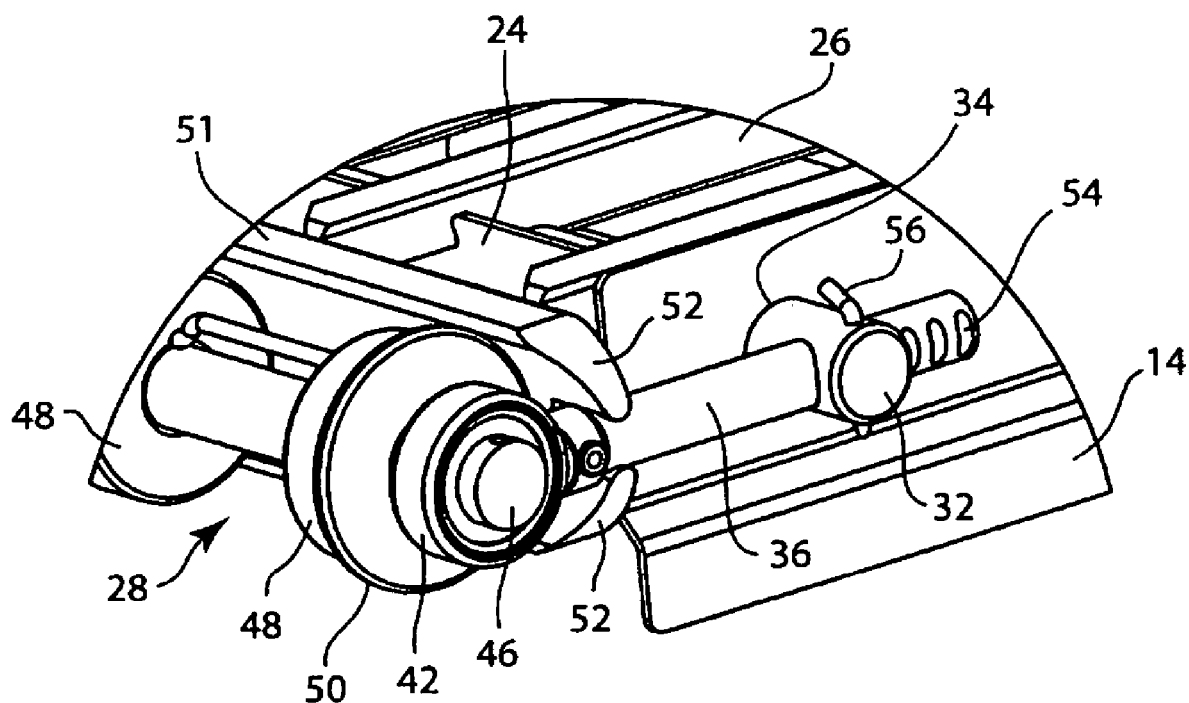
FIG. 7 is a detailed view taken along line 7-7 of FIG. 4.
Figure 8:
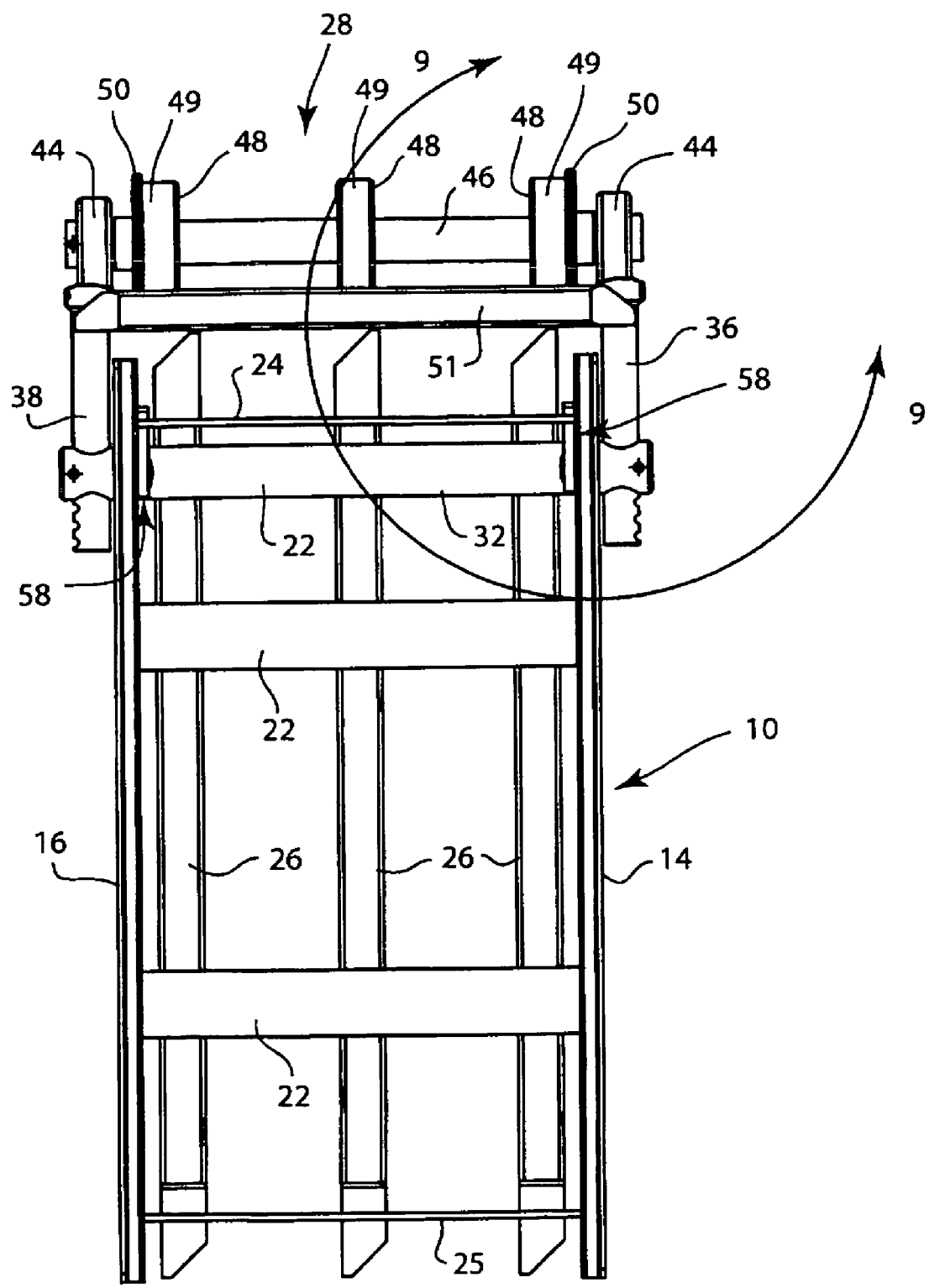
FIG. 8 is a bottom view of the tip-up tail assembly of FIG. 4.
Figure 9:
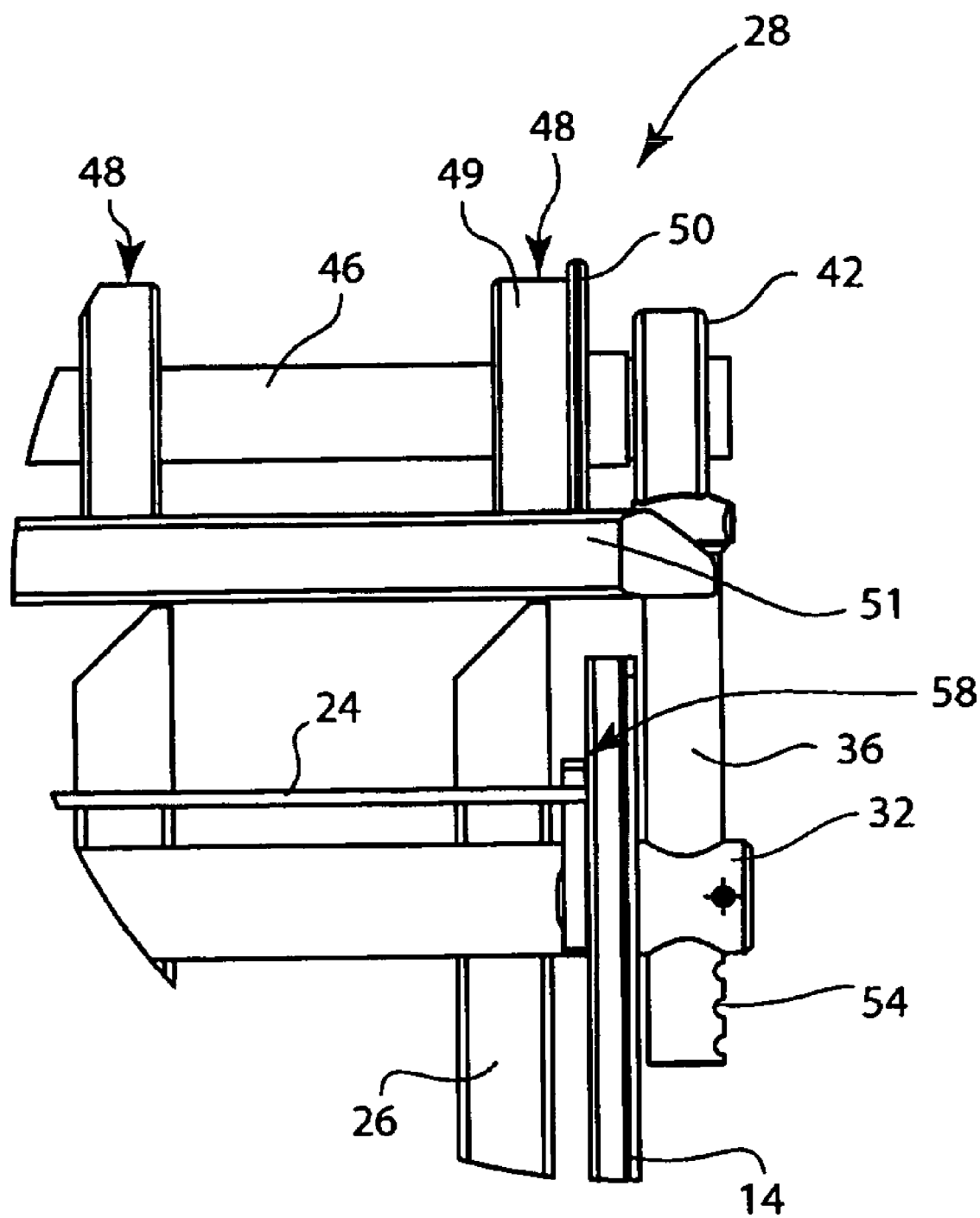
FIG. 9 is a detailed view taken along line 9-9 of FIG. 8.

As clearly seen in FIGS. 2 and 7, each of the side arms 36, 38 include a series of adjustment grooves 54 that are engaged by a locking pin 56 that extends through a hole 57 (FIGS. 6B and 6C) formed in the outer end of axle 32. The engagement between the locking pin 56 and one of the adjustment grooves 54 restricts the movement of the tip-up tail assembly 28 relative to the conveyor assembly 10. The adjustment of the length of the side arms 36, 38 and the positioning of rollers 48 relative to the axle 32 made possible by manipulation of locking pins 56 allows the tail assembly 28 to adjust the tension on the conveyor belt 12.

Figure 3:
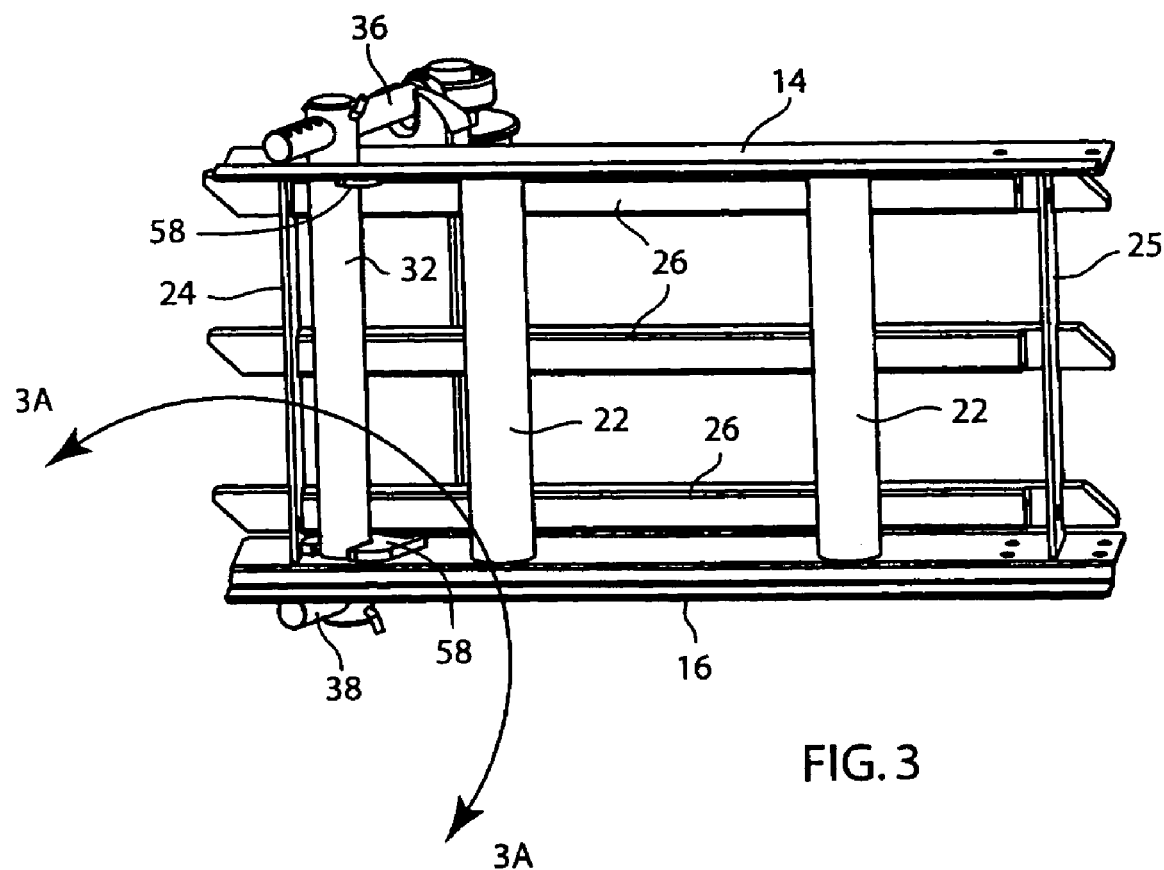
FIG. 3 is a bottom perspective view showing the locking mechanism with the tip-up tail assembly in its retracted position.
Figure 3A:
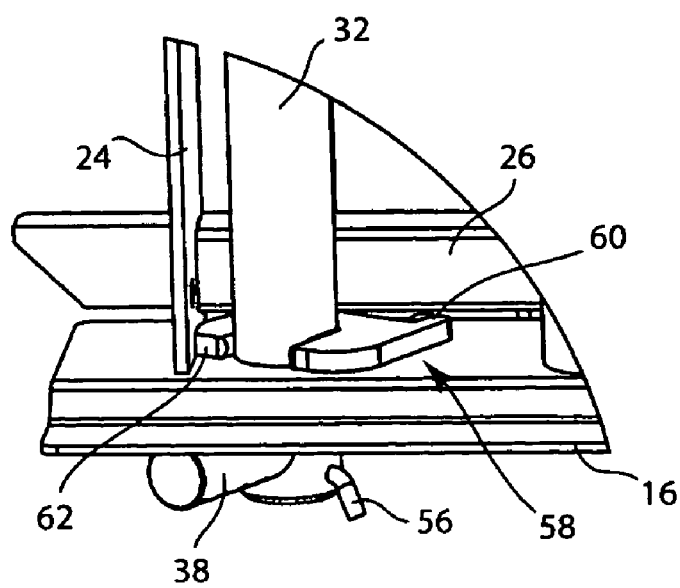
FIG. 3A is a detailed view taken along line 3A-3A of FIG. 3.
Figure 3B:
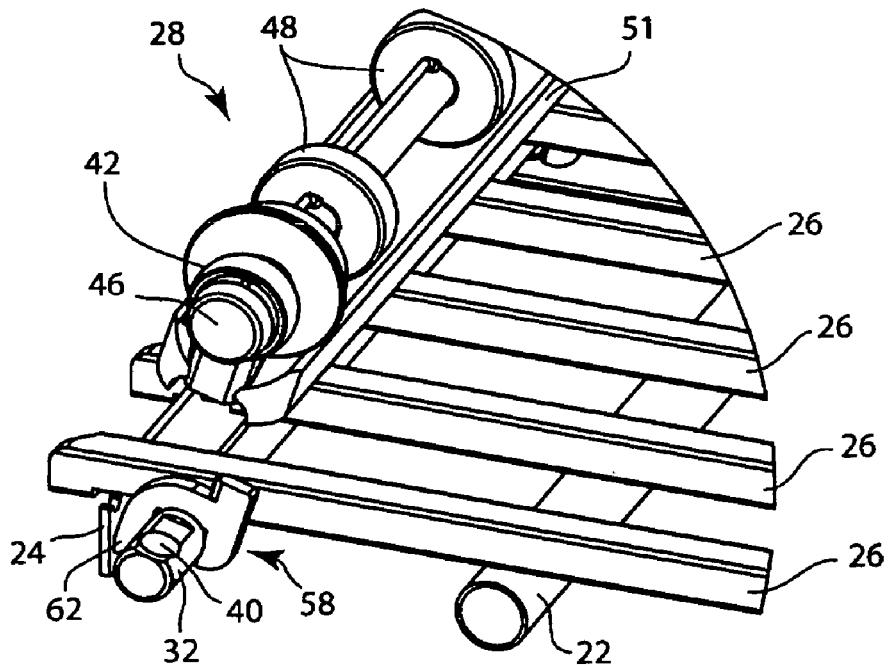
FIG. 3B is a partial top perspective view broken away to show the locking mechanism in the retracted position.
Figure 3C:
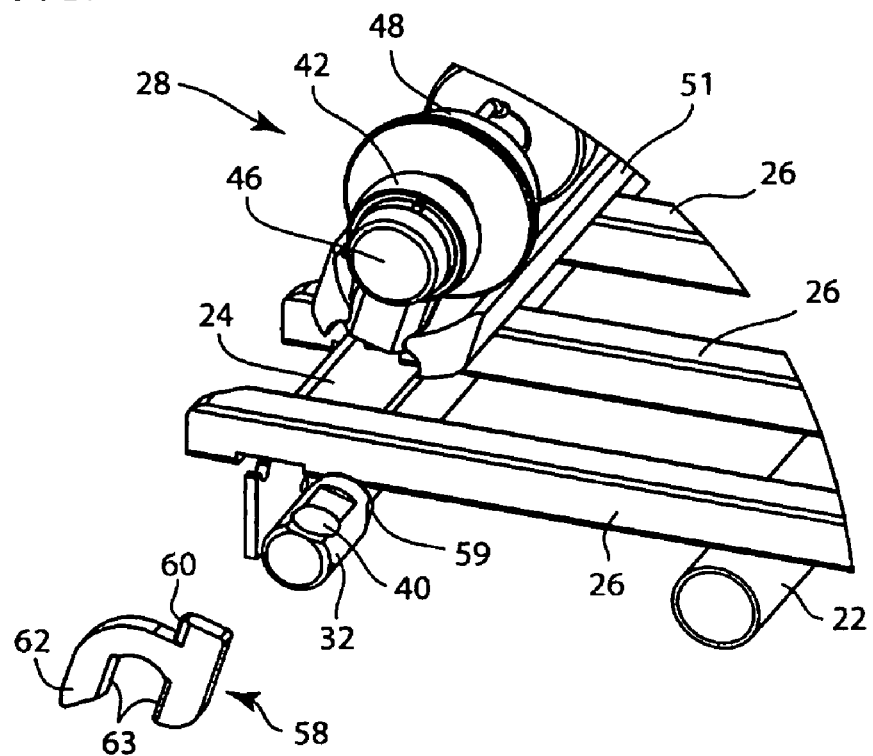
FIG. 3C is a view like FIG. 3B but showing the locking mechanism in an exploded view.
Figure 6:
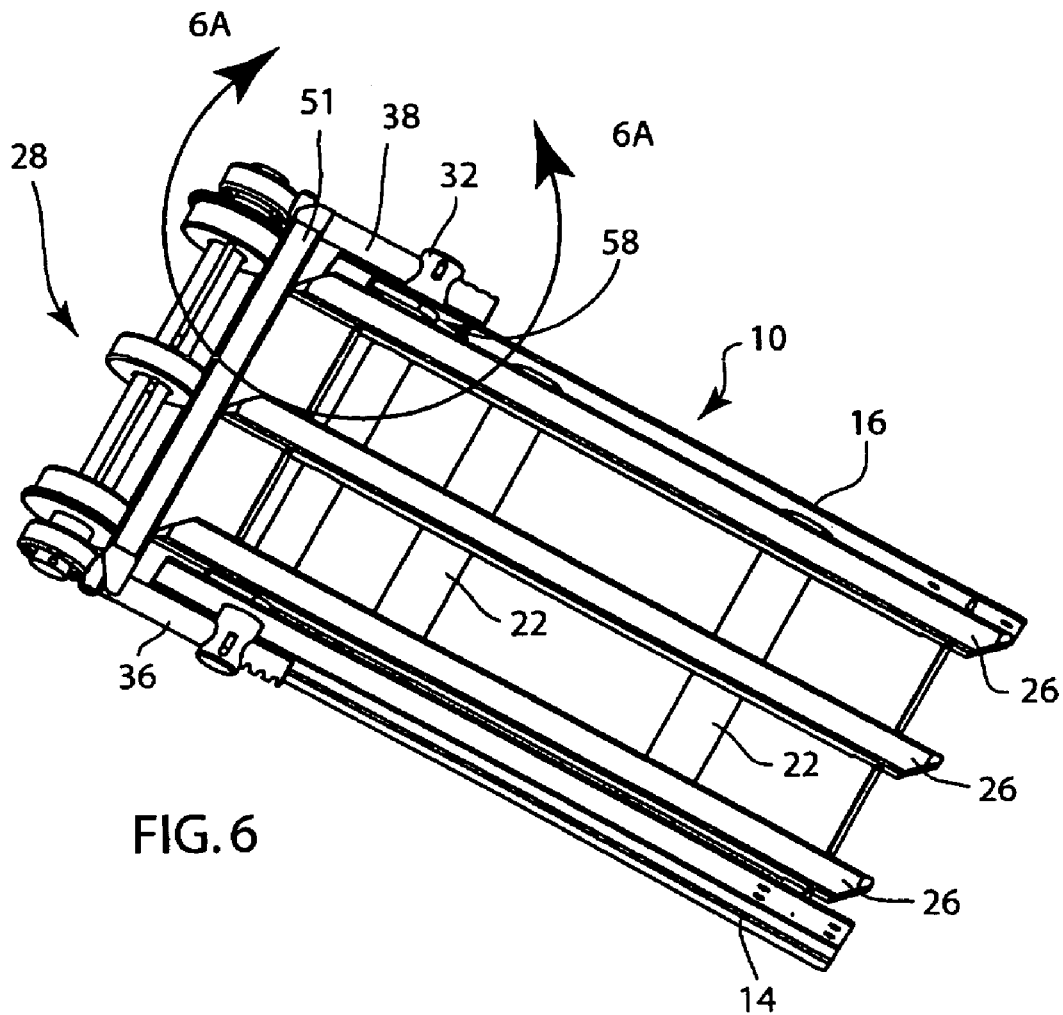
FIG. 6 is a top perspective view of the tip-up tail assembly in the horizontal operating position showing the lock mechanism.
Figure 6A:
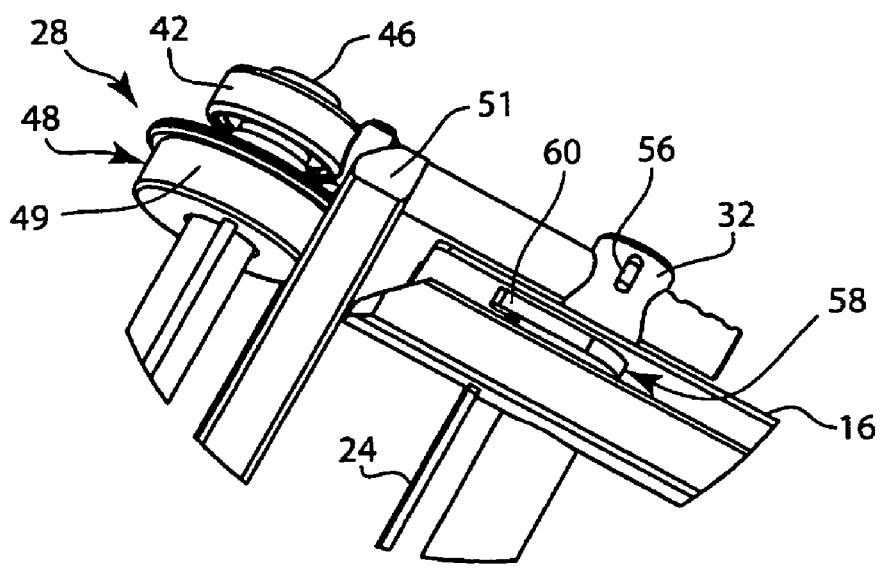
FIG. 6A is a detailed view taken along line 6A-6A of FIG. 6.

Referring now to FIGS. 2A, 3, 3A, 3B, 3C, 6B and 6C, a locking mechanism or clip 58 is removably fastened to opposite ends of the rotatable axle 32 inside the side frame members 14, 16. As seen in FIG. 6C, frictional retention occurs between surfaces 63 of the clip 58 and a groove 59 formed on each outer end of axle 32. Each locking mechanism 58 has a first stop portion 60 and a second stop portion 62 which are respectively moved into and out of engagement with cross support 24 positioned forwardly of and adjacent the axle 32 upon rotation of the tip-up tail assembly 28 on axle 32. FIGS. 3, 3A and 3B show the first stop portion 60 of the locking mechanism 58 disengaged from the cross support 24 when the tip-up tail assembly 28 is in the retracted position of FIGS. 1 and 2. Second stop portion 62, however, is engaged against the rear surface of cross support 24 and limits the amount of rotation of the tip-up tail assembly 28 in the retracted position. FIGS. 6, 6A and 6B show the locking mechanism stop portion 60 engaged with a notch 64 (FIG. 6C) formed in the top and outer end of cross support 24 in a manner which will hold the tip-up tail assembly 28 in the extended horizontal operating position shown in FIGS. 4 and 5 in which the conveyor assembly 10 normally operates. Stop portion 62 moves out of engagement with the rear surface of cross support 24 during rotation of tip-up tail assembly 28 to the operating position.

Figure 4:
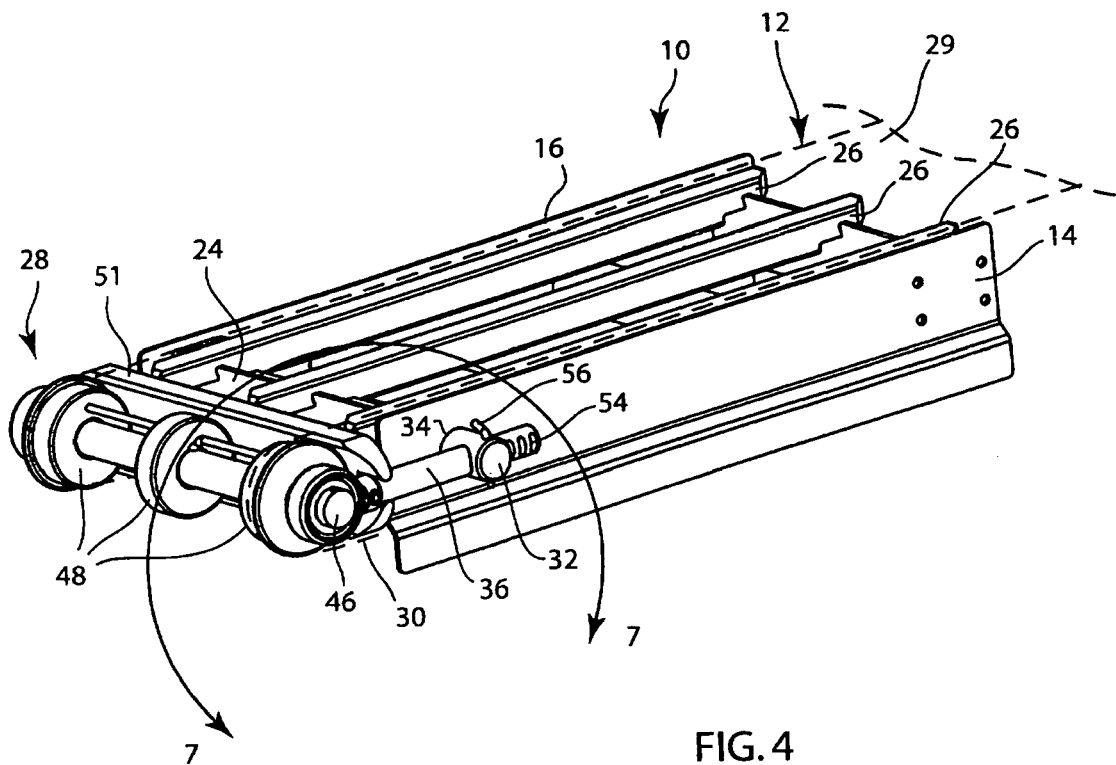
FIG. 4 is a perspective view illustrating the tip-up tail assembly in a horizontal operating position.

In use, the tip-up tail assembly 28 is normally held in the extended, horizontal operating position shown in FIGS. 4 and 5 by means of the stop portion 60 of locking mechanism 58 engaging cross support 24. In the normal operating position, the rollers 48 provide a transition point between the upper run 29 and the lower run 30 of the moving conveyor belt 12. The upper run 29 runs along and is supported on the surfaces of the slide rails 26, while the lower run 30 passes between the side frame members 14, 16 in a conventional manner. Further, in the normal operating position, the longitudinal axes of the side arms 36, 38 and the side frame members 14, 16 are substantially parallel to each other, as are the planes of the upper and lower runs 29, 30 of the conveyor belt 12. The length of the side arms 36, 38 determines the tension placed on the conveyor belt 12 at the transition point. If it is desired to change the tension on the conveyor belt, the locking pins 56 are manually removed without the use of tools, and the side arm lengths are adjusted to place the rollers 48 in contact with the conveyor belt 12 at a tension as desired. Then, the locking pins 56 are replaced through the holes 57 and reinserted in the appropriate adjustment grooves 54.

Should it become necessary to sanitize the conveyor assembly 10, the tip-up tail assembly 28 can be manually rotated about axle 32 to the retracted position of FIGS. 1 and 2. When moving the tip-up tail assembly 28 to the retracted position, the tension on the conveyor belt 12 is released by the rotational movement of the side arm without requiring the removal of the locking pins. When the tip-up tail assembly 28 is actually moved to the retracted position of FIGS. 1 and 2, the upper run 29 of the conveyor belt 12 is temporarily lifted upwardly away from the slide rails 26 of the conveyor assembly 10. In the retracted position, the longitudinal axes of the side arms 36, 38 lie at substantially acute angles relative to the longitudinal axes of the side frame members 14, 16. The reduced tension setting enables the conveyor belt 12 to move somewhat laterally beyond the flanges 50 on outermost rollers 48 to allow access to the surface areas of the conveyor assembly 10 for cleaning. As a result, the conveyor assembly 10 may be conveniently sanitized by simply rotating the tip-up tail assembly 28 without removal of the conveyor belt 12 from the conveyor assembly 10 and without the need for any tools to assemble and disassemble the tip-up tail assembly 28.

Once cleaning is complete, the tail assembly 28 is again rotated to its horizontal, operating position of FIG. 4 to reset the required tension for the conveyor belt 12. As can be understood by the above description, the tip-up tail assembly 28 can be moved from its operating position to its retracted, cleaning position without the requirement of any additional tooling. The extension of the rollers 48 from the conveyor assembly 10 is controlled by the length of the side arms 36, 38. The length of the side arms 36, 38 can be adjusted by simply removing the locking pins 46 and extending the side arms 36, 38 as previously described.

In addition to being rotatable to the retracted, cleaning position without the requirement of any additional tooling, the tail assembly 28 of the present invention can be completely removed without additional tooling. If the tail assembly 28 is to be removed, each of the locking pins 56 are removed. Once the locking pins 56 have been removed, the side arms 36, 38 can be removed from the axle 32. The removal of the side arms 36, 38 removes the entire associated tail assembly 28 from the pair of side rails 14, 16. Once the tail assembly 28 has been removed, the pair of spaced locking mechanisms 58 can be separated from the axle 32 such that the entire axle 32 can be removed from between the pair of spaced side frames 14, 16. In this manner, the entire tip-up tail assembly 28 can be removed for cleaning without the requirement of additional tools.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. A tip-up tail assembly for use with a conveyor assembly having a continuous conveyor belt having an upper run and a lower run supported on support members between a pair of spaced side frame members, each side frame member extending between a first end and a second end, the tip-up tail assembly comprising:
   an axle extending between the side frame members and having outer ends protruding beyond the side frame members and formed with bores passing transversely therethrough, the axle being rotatably mounted in the side frame members at one of the first and second ends thereof; and
   a pair of spaced side arms having first ends received and adjustably retained in the bores of the axle, and second ends rotatably receiving opposite ends of a roller assembly having one or more rollers mounted to a roller shaft and engagable with the conveyor belt, the side arms and roller assembly being rotatable with the axle between an operating position in which the one or more rollers and the roller shaft extend longitudinally outward from one of the first and second ends of the side frame members such that the roller assembly maintains tension on the conveyor belt and a retracted position in which the one or more rollers and the roller shaft of the roller assembly are positioned above the side frames members to release tension on the conveyor belt,
   wherein the first ends of the side arms are each movable into and out of the bores in the axle to adjust the tension in the conveyor belt when the side arms and roller assembly are in the operating position.

2. The tip-up tail assembly of claim 1, wherein the conveyor assembly further includes cross supports connected between the side frame members for holding the support members.

3. The tip-up tail assembly of claim 2, further comprising at least one locking mechanism attached to the axle and engagable with one of the cross supports for defining the extent of rotational travel of the pair of side arms and the roller assembly between the operating and retracted positions.

4. The tip-up tail assembly of claim 3, wherein the tip-up tail assembly includes a pair of locking mechanisms each positioned immediately adjacent inside surfaces of the side frame members.

5. The tip-up tail assembly of claim 3, wherein each locking mechanism is a clip removably attached to the axle.

6. The tip-up tail assembly of claim 5, wherein each clip is frictionally retained on the axle and received in a groove formed on the axle.

7. The tip-up tail assembly of claim 3, wherein each locking mechanism has a first stop portion engagable with a top portion of the one cross support when the tail assembly is in the operating position.

8. The tip-up tail assembly of claim 3, wherein each locking mechanism has a second stop portion engagable with a rear surface of the one cross support when the tail assembly is in the retracted position.

9. The tip-up tail assembly of claim 1, wherein each of the first ends of the side arms have a series of adjustment grooves which are selectively engagable with pins passing transversely through outer ends of the axle to fix the length of the side arms and set the tension on the conveyor belt.

10. The tip-up tail assembly of claim 1, wherein a support brace is interconnected between the side arms adjacent the roller assembly.

11. The tip-up tail assembly of claim 1, wherein the side arms are elongated, cylindrical members.

12. The tip-up tail assembly of claim 1, wherein the second ends of the side arms include a roller housing having a bearing assembly for receiving a roller shaft.

13. The tip-up assembly of claim 12, wherein the roller shaft carries a series of spaced conveyor belt-engaging rollers.

14. The tip-up tail assembly of claim 13, wherein certain of the rollers are formed with flanges for restricting lateral movement of the conveyor belt.

15. The tip-up tail assembly of claim 13, wherein the rollers are formed of UHMW plastic.

* * * * *